United States Patent
Dextreit et al.

(10) Patent No.: US 10,259,445 B2
(45) Date of Patent: Apr. 16, 2019

(54) VEHICLE AND METHOD OF CONTROL THEREOF

(71) Applicant: Jaguar Land Rover Limited, Coventry, Warwickshire (GB)

(72) Inventors: Clement Dextreit, Coventry (GB); Mark Ellis, Coventry (GB); Matt Hancock, Coventry (GB)

(73) Assignee: Jaguar Land Rover Limited, Coventry, Warwickshire (GB)

( * ) Notice: Subject to any disclaimer, the term of this patent is extended or adjusted under 35 U.S.C. 154(b) by 2 days.

(21) Appl. No.: 15/645,566

(22) Filed: Jul. 10, 2017

(65) Prior Publication Data

US 2017/0305406 A1 Oct. 26, 2017

Related U.S. Application Data

(63) Continuation of application No. 14/650,696, filed as application No. PCT/EP2013/076130 on Dec. 10, 2013, now Pat. No. 9,725,083.

(30) Foreign Application Priority Data

Dec. 10, 2012 (GB) .................................. 1222181.8

(51) Int. Cl.
*B60K 6/48* (2007.10)
*B60W 10/06* (2006.01)
(Continued)

(52) U.S. Cl.
CPC ............. *B60W 20/10* (2013.01); *B60K 6/48* (2013.01); *B60W 10/06* (2013.01); *B60W 10/08* (2013.01);
(Continued)

(58) Field of Classification Search
CPC ...... B60W 20/10; B60W 10/06; B60W 10/08; B60W 20/00; B60W 20/40; B60W 30/16; B60K 6/48; B60Q 50/082
(Continued)

(56) References Cited

U.S. PATENT DOCUMENTS

| | | | | |
|---|---|---|---|---|
| 5,400,864 A | * | 3/1995 | Winner | B60K 31/0008 180/169 |
| 6,116,369 A | * | 9/2000 | King | B60K 31/0008 180/169 |

(Continued)

FOREIGN PATENT DOCUMENTS

| | | |
|---|---|---|
| DE | 10 2006 017176 A1 | 10/2007 |
| DE | 10 2011 003486 A1 | 8/2012 |

(Continued)

*Primary Examiner* — Jean Paul Cass
(74) *Attorney, Agent, or Firm* — Myers Bigel, P.A.

(57) ABSTRACT

In an aspect of the invention there is provided a speed control system for a hybrid electric vehicle, the vehicle having at least one engine and at least one electric machine, the system being operable to allow a driver to set a target vehicle speed, the system being operable in first and second speed control modes to control the vehicle to maintain the target vehicle speed, in the first speed control mode the system being configured to limit operation of the vehicle to an electric vehicle (EV) mode, in the second speed control mode the system being configured not to limit operation of the vehicle to the EV mode, wherein when the control system is in the first mode and at least one of a prescribed one or more conditions is met, e.g. a rate of acceleration demanded by the driver or a difference between a target vehicle speed and a current vehicle speed exceeds a respective prescribed threshold value, the system is operable to not limit operation of the vehicle to the EV mode.

20 Claims, 2 Drawing Sheets

(51) Int. Cl.
  *B60W 10/08* (2006.01)
  *B60W 20/00* (2016.01)
  *B60W 20/10* (2016.01)
  *B60W 20/40* (2016.01)
  *B60W 30/16* (2012.01)
  *B60W 50/08* (2012.01)

(52) U.S. Cl.
  CPC ............ *B60W 20/00* (2013.01); *B60W 20/40* (2013.01); *B60W 30/16* (2013.01); *B60W 50/082* (2013.01); *B60K 2006/4825* (2013.01); *B60W 2520/10* (2013.01); *B60W 2540/10* (2013.01); *B60W 2550/20* (2013.01); *B60W 2550/308* (2013.01); *B60W 2550/40* (2013.01); *B60W 2710/06* (2013.01); *B60W 2710/083* (2013.01); *Y02T 10/6221* (2013.01); *Y02T 10/6252* (2013.01); *Y10S 903/93* (2013.01)

(58) Field of Classification Search
  USPC .......................................................... 701/22
  See application file for complete search history.

(56) References Cited

U.S. PATENT DOCUMENTS

| | | | |
|---|---|---|---|
| 7,290,627 B1 | 11/2007 | Gardner | |
| 8,162,088 B2 | 4/2012 | Haug | |
| 8,500,589 B2* | 8/2013 | Ortmann | B60K 6/387 475/152 |
| 9,637,125 B2* | 5/2017 | Dextreit | B60W 50/085 |
| 9,815,451 B2* | 11/2017 | Dextreit | B60W 20/12 |
| 2006/0278449 A1* | 12/2006 | Torre-Bueno | B60K 6/46 180/65.29 |
| 2007/0227791 A1* | 10/2007 | Ueno | B60K 6/387 180/65.245 |
| 2007/0278022 A1* | 12/2007 | Tanishima | B60K 6/383 180/65.285 |
| 2009/0076697 A1* | 3/2009 | Syed | B60T 8/174 701/70 |
| 2009/0114463 A1* | 5/2009 | Devault | B60K 6/365 180/65.29 |
| 2009/0124450 A1* | 5/2009 | Silveri | B60K 6/442 477/5 |
| 2009/0171523 A1* | 7/2009 | Luo | B60W 20/40 701/22 |
| 2009/0287366 A1* | 11/2009 | Davis | B60K 6/48 701/22 |
| 2010/0106351 A1* | 4/2010 | Hanssen | B60K 6/48 701/22 |
| 2011/0022255 A1* | 1/2011 | Yamada | B60K 6/46 701/22 |
| 2011/0035135 A1 | 2/2011 | Schwalm et al. | |
| 2011/0130906 A1* | 6/2011 | Mayer | G07C 5/008 701/22 |
| 2011/0130916 A1* | 6/2011 | Mayer | G07C 5/008 701/31.4 |
| 2011/0320075 A1* | 12/2011 | Kim | B60K 6/445 701/22 |
| 2014/0229044 A1* | 8/2014 | Dai | B60W 20/30 701/22 |
| 2015/0111693 A1* | 4/2015 | Wang | B60K 6/48 477/5 |
| 2015/0126329 A1* | 5/2015 | Johri | B60W 10/08 477/5 |
| 2015/0134160 A1* | 5/2015 | Liang | B60W 10/06 701/22 |
| 2015/0239467 A1* | 8/2015 | Wang | B60K 6/48 477/5 |
| 2016/0046282 A1* | 2/2016 | Yamazaki | B60W 20/40 477/5 |
| 2016/0059846 A1* | 3/2016 | Wang | B60W 20/40 477/5 |
| 2016/0107633 A1* | 4/2016 | Liang | B60W 20/10 701/22 |
| 2016/0134160 A1 | 5/2016 | Liang et al. | |

FOREIGN PATENT DOCUMENTS

| | | |
|---|---|---|
| EP | 2 133 252 A1 | 12/2009 |
| FR | 2 936 450 A1 | 4/2010 |
| JP | 2010-143512 A | 7/2010 |
| JP | 2012-086801 A | 5/2012 |
| JP | 2012-091558 A | 5/2012 |
| KR | 100887797 B1 | 3/2009 |
| KR | 10-2012-0126143 A | 11/2012 |
| WO | WO 2012/035405 A8 | 9/2012 |

\* cited by examiner

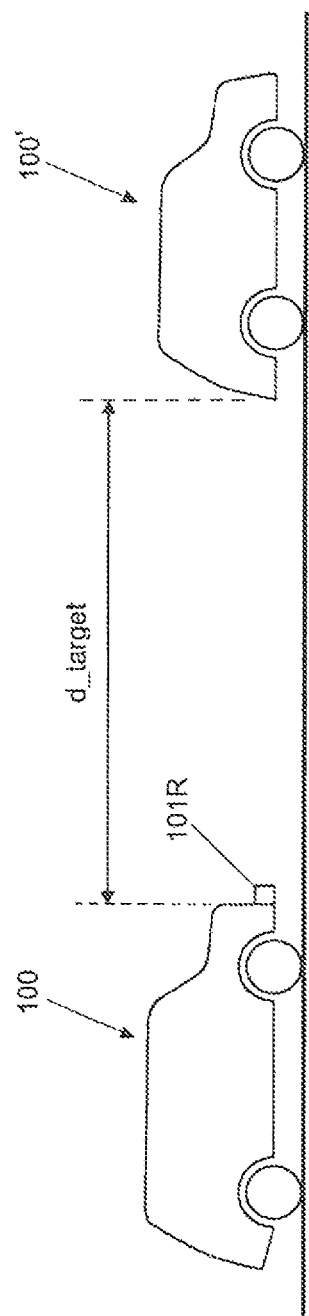

VEHICLE AND METHOD OF CONTROL THEREOF

FIELD OF THE INVENTION

The present invention relates to vehicles having adaptive cruise control and regenerative braking capability. In particular but not exclusively embodiments of the invention relate to electric vehicles and to hybrid electric vehicles.

BACKGROUND

It is known to provide a motor vehicle having an adaptive cruise control (ACC) system. The ACC system is operable to maintain the host vehicle at a driver set speed unless a vehicle ahead of the host vehicle is travelling at a slower speed. If such a vehicle is encountered, the ACC system is operable to allow the driver to indicate a desired following distance that is to be maintained behind the followed vehicle. The ACC system controls a powertrain and a foundation braking system of the host vehicle to maintain the driver desired distance behind the followed vehicle. The ACC system is operable to resume the driver set speed if the followed vehicle is passed or moves aside.

It is desirable to provide ACC functionality in a hybrid electric vehicle in such a manner as to allow efficient operation of the hybrid vehicle.

STATEMENT OF THE INVENTION

Embodiments of the invention may be understood with reference to the appended claims.

Aspects of the present invention provide a control system, a vehicle and a method.

In one aspect of the invention for which protection is sought there is provided a speed control system for a hybrid electric vehicle, the vehicle having at least one engine and at least one electric machine, the system being operable to allow a driver to set a target vehicle speed, the system being operable in first and second speed control modes to control the vehicle to maintain the target vehicle speed, in the first speed control mode the system being configured to limit operation of the vehicle to an electric vehicle (EV) mode, in the second speed control mode the system being configured not to limit operation of the vehicle to the EV mode, wherein when the control system is in the first mode and at least one of a prescribed one or more conditions is met, the system is operable to not limit operation of the vehicle to the EV mode.

Embodiments of the invention have the advantage that operation of the vehicle in EV mode takes place unless one or more of the prescribed one or more conditions is met. Thus embodiments of the invention increase a likelihood that a vehicle will continue to operate in EV mode even when a speed control system is selected by a driver.

It is to be understood that if when in the first mode at least one of the prescribed one or more conditions is met, the system may be operable to not limit operation of the vehicle to the EV mode by assuming the second mode. The system may subsequently revert to the first mode once the prescribed one or more conditions are no longer met, and, optionally, one or more further prescribed conditions are also met. Other arrangements are also useful.

The system may be operable to maintain a prescribed distance behind a followed vehicle at a speed not exceeding the target vehicle speed, the prescribed distance optionally corresponding to a driver-prescribed distance.

A value of the prescribed distance may be determined by the vehicle in dependence on a speed of the vehicle. Thus the prescribed distance may increase with vehicle speed in some embodiments.

The system may be operable to determine a required rate of acceleration of the vehicle in order to maintain the prescribed distance behind the followed vehicle, the system being operable in the first mode to limit operation of the vehicle to the EV mode by limiting a maximum rate of acceleration that may be commanded by the system to a rate that is achievable in EV mode.

The system may be operable in the first mode to limit the maximum rate of acceleration that may be commanded by the system to a rate corresponding substantially to the maximum rate achievable in EV mode.

Alternatively or in addition the system may be operable in the first mode to limit operation of the vehicle to the EV mode by limiting a maximum amount of torque that may be commanded by the system to an amount that is achievable in EV mode.

The system may be operable in the first mode to limit the maximum amount of torque that may be commanded by the system to a rate corresponding substantially to the maximum amount achievable in EV mode.

It is to be understood that by reference to a rate of acceleration or amount of torque that is achievable in EV mode is meant a current value of achievable rate of acceleration or amount of torque, being the value achievable at a given moment in time as the vehicle travels. The achievable value may depend for example on battery state of charge, temperature of one or more components such as a propulsion motor, and/or one or more other parameters and therefore may vary during the course of a given journey. The system may be operable to receive data corresponding to maximum achievable acceleration rate and/or torque or calculate the maximum achievable value in response to data in respect of the value of one or more parameters.

In some embodiments the system may be operable wherein the prescribed one or more conditions includes a condition that the driver demands a rate of acceleration of the vehicle which exceeds a prescribed threshold value.

Such driver-demanded acceleration which exceeds a prescribed threshold value may for example result from a change, especially a relatively sudden change, in any of various driving or road conditions. Examples of such changes may include for instance an encountering of an increased legal speed limit or a turning off or a sudden speeding away of a followed vehicle.

In other embodiments the system may be operable wherein the prescribed one or more conditions includes a condition that the driver demands an amount of drive torque which exceeds a prescribed threshold value.

Likewise, such driver-demanded drive torque which exceeds a prescribed threshold value may for example result from a change, especially a relatively sudden change, in any of various driving or road conditions. Examples of such changes may include for instance an encountering of an increased gradient of a driving surface or a particularly uneven driving terrain.

In still other embodiments the system may be operable wherein the prescribed one or more conditions includes a condition that a difference between the target vehicle speed and a current vehicle speed exceeds a prescribed value, such as a prescribed delta_speed value.

The prescribed delta speed value may be determined in dependence at least in part on a gradient of a surface over which the vehicle is driving.

The gradient of the driving surface may be determined in dependence on measurement of a pitch angle of the vehicle. Other methods are also useful.

The delta speed value may be arranged to reduce with increasing uphill gradient and/or decrease with increasing downhill gradient.

Advantageously, the system may be operable wherein one of the prescribed one or more conditions includes a condition that a difference between the target vehicle speed and a current vehicle speed exceeds a prescribed delta_speed value and a followed vehicle is accelerating at a rate exceeding a prescribed rate, which may be a followed vehicle acceleration rate.

The prescribed followed vehicle acceleration rate may be arranged to reduce with increasing uphill gradient and/or decrease with increasing downhill gradient.

The prescribed followed vehicle acceleration rate may be determined at least in part in dependence on gradient of a surface over which the vehicle is driving.

It is to be understood that when the vehicle (which may be referred to as a host vehicle since it hosts the ACC system) is operated in the first mode (which may also be referred to as an economy or ECO mode) under relatively gentle driving conditions the vehicle may follow a followed vehicle and maintain a relatively constant distance behind the followed vehicle with the at least one engine switched off, thereby reducing fuel consumption.

However, in some scenarios, when in the first mode the followed vehicle may accelerate away from the host vehicle at a rate exceeding that which may be achieved by the host vehicle with the at least one engine switched off. A distance between the host vehicle and the followed vehicle may therefore increase at a rate that decreases driver enjoyment. In order to overcome this problem, the ACC system may be configured such that if the followed vehicle accelerates at a rate such that the speed difference between the followed vehicle and the host vehicle exceeds a prescribed value the at least one engine is switched on in order to enable the host vehicle to achieve a higher rate of acceleration.

In some embodiments the at least one engine may be switched on until the speed difference between the followed and host vehicles falls below a prescribed threshold speed value. Other arrangements may also be useful.

It is to be understood that if the host vehicle is following a followed vehicle in relatively slow moving traffic such that the speed difference exceeds the prescribed value but the followed vehicle is also traveling at a relatively slow speed (for example, a speed below a prescribed low speed threshold such as 10 km/h, 15 km/h, 20 km/h or any other suitable value), the ACC system may be arranged to maintain the at least one engine switched off.

The prescribed rate of acceleration of the followed vehicle may correspond substantially to the maximum rate of acceleration that the system is permitted to command when the system is operating in the first mode and none of the prescribed one or more conditions is met.

Other values are also useful, such as a value corresponding to the maximum rate of acceleration that the system is permitted to command when the system is operating in the first mode multiplied by a factor such as 1.3, 1.5, 1.7, 2 or any other suitable value.

The prescribed one or more conditions may include a condition that the driver demands a rate of acceleration of the vehicle which exceeds a prescribed threshold value.

Alternatively or in addition the prescribed one or more conditions may include a condition that the driver demands an amount of drive torque which exceeds a prescribed threshold value.

The system may be operable automatically to assume the second mode if whilst in the first mode the at least one engine is started more than a prescribed number of times within a prescribed period of time.

The system may be operable automatically to assume the second mode if whilst in the first mode it is determined that a density of traffic exceeds a prescribed value.

The system may be operable to determine the density of traffic responsive to traffic density data received by the system from a traffic information service.

The ACC means may for example be provided with data in respect of the presence of one or more other vehicles behind, ahead of and/or to the side of the host vehicle in addition to the presence of the followed vehicle ahead, and from which vehicles passing or vehicles being passed may be detected. Optionally the data may be provided by another vehicle system responsive to detection of other vehicles, for example by means of one or more radar or ultrasonic sensors or other arrangement. In some embodiments one or more parking sensors may be employed to detect traffic. This feature has the advantage that data that may be acquired by an existing vehicle system may be employed, eliminating a requirement to install dedicated sensors for the ACC system.

The system may be operable to determine the density of traffic responsive to detection of a prescribed number of vehicles passing the vehicle within a prescribed period of time.

The system may be operable to determine the density of traffic responsive to detection of a prescribed number of vehicles passed by the vehicle within a prescribed period of time.

Advantageously the system may be operable automatically to assume the second mode if whilst in the first mode the driver increases the rate of acceleration of the vehicle above the maximum value available in EV mode, for example by actuation of an accelerator pedal, one or more selected from a prescribed number of times in a given time period, a prescribed number of times over a given distance and a prescribed number of times over a given journey.

It is to be understood that a driver might demand drive torque exceeding that which may be providable in the first mode when a gap between the host vehicle and the vehicle ahead increases at a rate causing concern to the driver. The driver's demand for torque indicates that the host vehicle is unable to meet the driver's currently desired driving style. Accordingly the ACC system may assume the second mode in order no longer to constrain the maximum achievable rate of acceleration of the vehicle. Such activity might also be undertaken if the vehicle is being driven on an undulating driving surface, such as over hilly terrain. Thus in some embodiments the ACC system may be operable to switch from the first mode to the second mode in the event it is determined that the vehicle is driving over excessively undulating terrain.

Advantageously one of the prescribed one or more conditions may include a condition that the maximum rate of acceleration achievable by the vehicle in EV mode is below a prescribed threshold value.

By way of example, if the vehicle is ascending a hill whilst in the first mode with the at least one engine switched off, the ACC system may determine that the maximum achievable rate of acceleration is below the prescribed threshold value. The ACC system may therefore trigger starting of the at least one engine in order to ensure that adequate acceleration is available should it be required.

Alternatively or in addition, one of the prescribed one or more conditions may include a condition that the maximum amount of torque achievable by the vehicle in EV mode is below a prescribed threshold value.

The ACC system may be arranged to monitor the rate of acceleration achievable by the vehicle in EV mode even whilst the at least one engine is switched on. If the ACC system determines that the rate of acceleration that would be achievable in EV mode exceeds the prescribed threshold value below which the at least one engine is switched on, the ACC system may be arranged to trigger operation in EV mode (and therefore shutdown of the at least one engine) provided the current value of driver demanded torque so permits. It is to be understood that a hysteresis may be introduced in respect of the value of achievable rate of acceleration below which the at least one engine is switched on and the value above which the at least one engine may be switched off in order to prevent mode chattering.

The system may comprise driver-operable means for selecting one of the first and second modes of operation.

The system may be operable to store data in respect of geographical locations at which an engine start has been commanded by the control system, when the vehicle subsequently approaches the same location in substantially the same direction of travel the system being operable to start the at least one engine in advance of arrival at the location such that drive torque generated as a consequence of starting the at least one engine may be delivered to a driveline of the vehicle substantially at said location.

The system may be configured to start the at least one engine in advance of arrival at the location such that drive torque from the engine may be delivered to a driveline of the vehicle substantially at said location.

The system may be configured to store said data in respect of geographical location only when the at least one engine was started in the absence of driver intervention causing an engine start such as accelerator pedal actuation.

Alternatively or in addition the system may be configured to store said data in respect of geographical location only when the at least one engine was started when the traffic density was below a threshold value.

Alternatively or in addition the system may be configured to store said data in respect of geographical location only when any followed vehicle was not accelerating at a rate exceeding a prescribed rate thereby triggering an engine start.

Optionally, the system may be operable to store said data in respect of geographical location only when the at least one engine was started (1) in the absence of driver intervention, (2) when the traffic density was below a threshold value and (3) when any followed vehicle was not accelerating at, a rate exceeding a prescribed rate.

In a further aspect of the invention for which protection is sought there is provided a hybrid electric vehicle comprising a system according to the preceding aspect or any embodiment thereof.

In another aspect of the invention for which protection is sought there is provided a method of controlling speed of a hybrid electric vehicle implemented by a control system, the method comprising:

allowing a driver to set a target vehicle speed;
controlling the vehicle to maintain the target speed;
in a first mode of operation of the control system the method comprising limiting operation of the vehicle to an electric vehicle (EV) mode;
in a second mode of operation of the control system the method comprising not limiting operation of the vehicle to the EV mode;
wherein when the control system is in the first mode and at least one of a prescribed one or more conditions is met, the method comprises not limiting operation of the vehicle to the EV mode.

In a further aspect of the invention for which protection is sought there is provided a method of controlling a hybrid electric vehicle having a powertrain comprising at least one electric propulsion motor and at least one engine; and adaptive cruise control (ACC) means, the method comprising allowing a driver to set a target vehicle speed and controlling the powertrain to maintain a prescribed distance behind a followed vehicle subject to the condition that the target speed is not exceeded, the method comprising operating the ACC system in one of a first mode in which the at least one engine is maintained switched off and a second mode in which the ACC means does not restrict switching on of the at least one engine, when in the first mode the method comprising determining by means of the ACC system whether a difference between the target vehicle speed and a current vehicle speed exceeds a prescribed value, in the event the difference does exceed the prescribed value the method comprising starting the at least one engine in order to increase the available rate of acceleration.

In one aspect of the invention for which protection is sought there is provided an adaptive cruise control (ACC) system for a hybrid electric vehicle having a powertrain comprising at least one electric propulsion motor and at least one engine, the ACC system being operable to allow a driver to set a target vehicle speed, the ACC system being further operable to control a powertrain of the vehicle so as to maintain the vehicle a prescribed distance behind a followed vehicle subject to the condition that the target speed is not to be exceeded, the ACC system being operable in a first mode in which the at least one engine is maintained switched off and a second mode in which the ACC means does not restrict switching on of the at least one engine, wherein when the ACC system is in the first mode and a difference between the target vehicle speed and a current vehicle speed exceeds a prescribed value the ACC system is operable to command starting of the at least one engine in order to increase the available rate of acceleration.

In an aspect of the invention there is provided a speed control system for a hybrid electric vehicle, the vehicle having at least one engine and at least one electric machine. The system may be operable to allow a driver to set a target vehicle speed. The system may be operable in first and second speed control modes to control the vehicle to maintain the target vehicle speed. In the first speed control mode the system may be configured to limit operation of the vehicle to an electric vehicle (EV) mode. In the second speed control mode the system may be configured not to limit operation of the vehicle to the EV mode. When the control system is in the first mode and at least one of a prescribed one or more conditions is met, e.g. a rate of acceleration demanded by the driver or a difference between a target vehicle speed and a current vehicle speed exceeds a respective prescribed threshold value, the system may be operable to not limit operation of the vehicle to the EV mode.

BRIEF DESCRIPTION OF THE DRAWINGS

Embodiments of the invention will now be described with reference to the accompanying drawings in which:

FIG. 2 is a schematic illustration showing a hybrid electric vehicle according to an embodiment of the present invention behind a followed vehicle.

DETAILED DESCRIPTION

Figure 1:
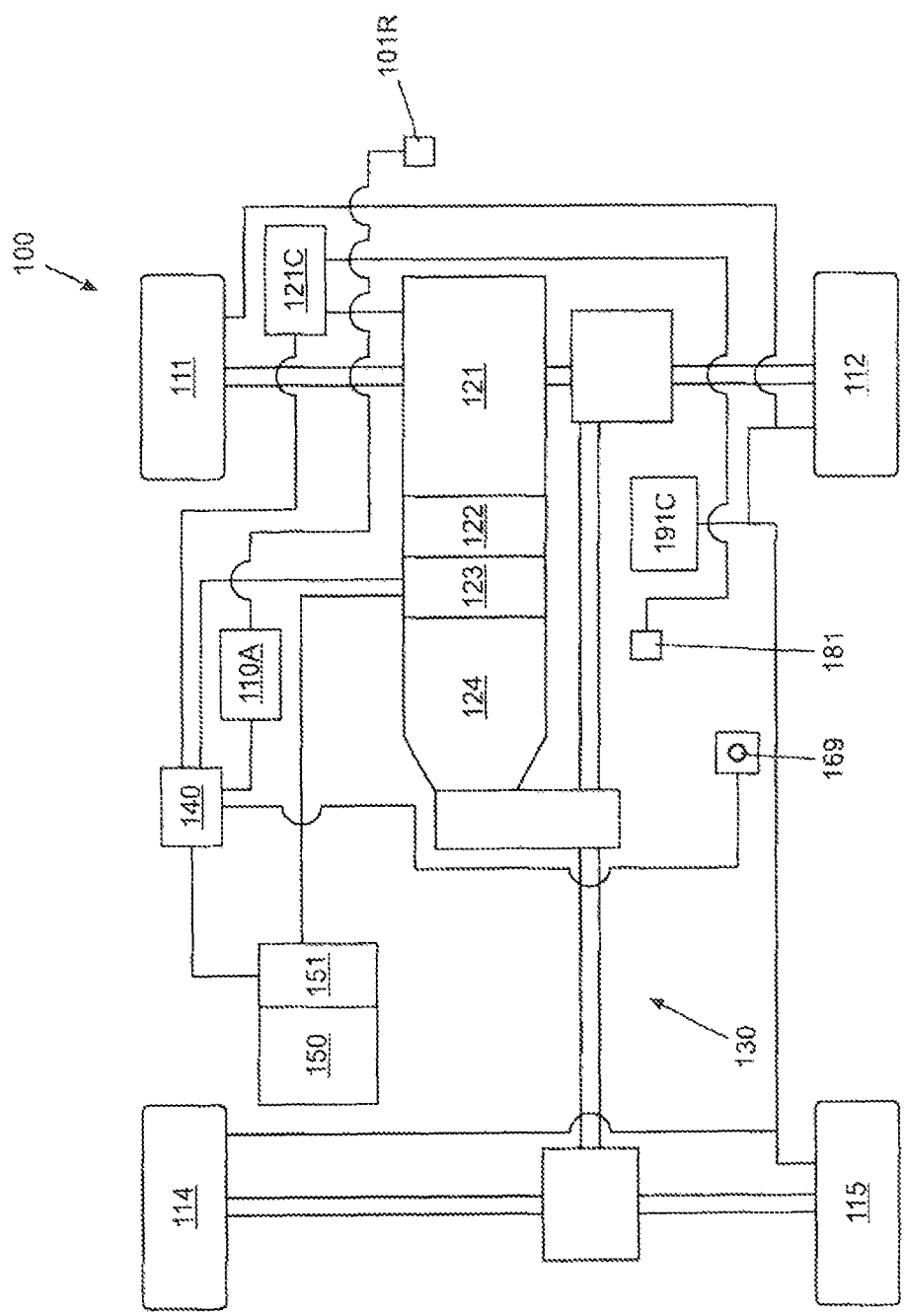
FIG. 1 is a schematic illustration of a hybrid electric vehicle (HEV) according to an embodiment of the present invention.

FIG. 1 shows a hybrid electric vehicle (HEV) 100 according to an embodiment of the present invention. The vehicle 100 has an internal combustion engine 121 and associated controller 121C. The engine 121 is releasably coupled to a crankshaft integrated motor/generator (CIMG) 123 by means of a clutch 122. The CIMG 123 is in turn coupled to an automatic transmission 124. It is to be understood that in some embodiments the transmission 124 may be a manual transmission instead of an automatic transmission. The transmission may comprise a manual gearbox, a continually variable transmission or any other suitable transmission.

The vehicle 100 is operable to provide drive torque to the transmission 124 by means of the engine 121 alone, the CIMG 123 alone or the engine 121 and CIMG 123 in parallel.

The vehicle 100 may therefore be referred to as a parallel-type hybrid vehicle. However it is to be understood that embodiments of the invention are also suitable for use with series-type hybrid vehicles in which only one or more electric machines are operable to provide motive torque, i.e. are operable as propulsion motors. In series-type hybrid vehicles an engine is provided for generating charge to power the one or more electric machines and not for providing direct drive torque. In some series-type hybrid vehicles the engine may be employed to generate charge to drive the one or more electric machines as propulsion motors whilst the one or more electric machines are providing propulsion to the vehicle in addition to or instead of charge delivered to the one or more propulsion motors from a battery of the vehicle. This enables more power to be developed by the motors in some embodiments. Some embodiments of the invention are useful in hybrid vehicles operable in either one of a parallel or series mode at a given moment in time.

It is to be understood that embodiments of the present invention are suitable for use with vehicles in which the transmission 124 is arranged to drive only a pair of front wheels 111, 112 or only a pair of rear wheels 114, 115, i.e. front wheel drive or rear wheel drive vehicles in addition to all wheel drive or selectable two wheel drive/four wheel drive vehicles. Embodiments of the invention are also suitable for vehicles having fewer than four wheels or more than four wheels.

The vehicle 100 has a battery 150 connected to an inverter 151 that generates a three-phase electrical supply that is supplied to the CIMG 123 when the CIMG 123 is operated as a motor. The battery 150 is arranged to receive charge from the CIMG 123 when the CIMG 123 is operated as a generator. The CIMG 123 may be operated as a generator in order to provide regenerative braking functionality in some embodiments. A brake controller 191C is arranged to control application of friction braking and/or regenerative braking according to a brake control methodology. According to the methodology, if the amount of braking required can be met by regenerative braking, regenerative braking alone is employed. If it cannot, then friction braking is employed in addition to regenerative braking.

The vehicle 100 is configured to allow a powertrain 129 of the vehicle 100 to operate in one of a hybrid electric vehicle (HEV) mode, an EV inhibit mode and a selectable electric vehicle only (EV-only) mode according to the state of a HEV mode selector 169.

In the HEV mode of operation the powertrain 129 is arranged to operate in one of a parallel boost mode, a parallel recharge mode, a parallel idle mode and a vehicle-selected EV mode.

In the parallel boost mode the engine 121 and CIMG 123 both apply positive torque to the transmission 124 (i.e. clutch 122 is closed) to drive the vehicle 100. In the parallel recharge mode the engine 121 applies, a positive torque to the transmission 124 whilst the CIMG 123 applies a negative torque whereby charge may be generated by the CIMG 123 to charge the battery 150. In the parallel idle mode the engine 121 applies a positive torque to the transmission 124 whilst the CIMG 123 applies substantially no torque. In the vehicle-selected EV mode (and in the driver selected EV-only mode) the clutch 122 is opened and the engine 121 is switched off. In the driver selected EV-only mode the CIMG 123 is operable to apply positive drive torque (or negative regenerative brake torque) to the transmission 124.

The vehicle 100 as controller 140 configured wherein when HEV mode is selected the powertrain 129 is operated in either the parallel boost mode, parallel recharge mode or EV mode according to an energy management strategy. The energy management strategy may also be referred to as a HEV control methodology.

It is to be understood that when in HEV mode the controller 140 is configured to determine a target torque that is to be developed by each of the engine 121 and CIMG 123 at least in part in dependence on an amount of driver demanded torque at a given moment in time. The controller 140 then causes the engine 121 and CIMG 123 to apply the respective target torques to an input shaft of the transmission 124. For example, if the controller 140 determines that operation in vehicle-selected EV mode is required, the controller 140 sets the target torque from the engine 121 to zero and provides a control signal to switch off the engine 121. The CIMG 123 is then caused to meet the driver torque demand. If the controller 140 determines that both the engine 121 and CIMG 123 are required to apply positive torque to the driveline 130 the controller 140 causes the engine 121 and CIMG 123 to provide the required values of torque to the driveline 130. If the controller 140 determines that the battery 150 is required to be charged, the CIMG 123 is controlled to apply a prescribed negative torque to the driveline 130 such that the CIMG 123 acts as a generator to generate charge to charge the battery 150.

It is to be understood that other arrangements may also be useful.

If the driver selects operation in the EV inhibit mode, the controller 140 is configured not to allow automatic stopping of the engine 121. Rather, the controller 140 maintains the engine 121 switched on. In some embodiments, in EV inhibit mode the vehicle is controlled such that when drive torque is required the drive torque is delivered by the engine 121 alone. In some embodiments, when in EV inhibit mode the vehicle is controlled such that driver torque is provided by the engine 121 in combination with the CIMG 123. Use of the engine 121 in combination with the CIMG 123 may be particularly useful if the engine 121 alone is unable to develop sufficient drive torque to meet driver torque demand.

If the driver selects operation of the vehicle 100 in EV-only mode and the engine 121 is running, the vehicle 100 is configured to open the clutch 122 and to switch off the engine 121. Again, the CIMG 123 is then operated either as a motor or as a generator. It is to be understood that the CIMG 123 may be arranged to act as a generator in the EV-only mode in order to effect regenerative braking of the vehicle 100 and emulate over-run/compression braking torque. However, operation of the CIMG 123 to effect regenerative braking is not limited to the EV-only mode and may be employed in any powertrain mode or vehicle mode.

The vehicle 100 has an adaptive cruise control (ACC) system 110A operable to implement an adaptive cruise control methodology. The ACC system 110A is operable to allow a driver to set a target speed target_speed being a speed that the ACC system 110A will seek to control the host vehicle 100 to maintain in the absence of slower traffic ahead of the vehicle 100.

The system 110A is configured to allow a driver to set a driver desired distance d_driver being a distance behind a followed vehicle 100' that the driver wishes to maintain behind a followed vehicle 100' subject to the limitation that the speed of the host vehicle 100 is not to exceed the target speed target_speed. FIG. 2 shows schematically a scenario in which the host vehicle 100 is behind a followed vehicle 100' that is travelling at a speed less than the target speed target_speed of the host vehicle 100.

The ACC system 110A is operable in a 'normal' (conventional) cruise mode of operation in which the system 110A is arranged to maintain a distance behind the followed vehicle 100' that is substantially equal to d_driver. The ACC system 110A determines the distance between the host vehicle 100 and followed vehicle 100' by means of a radar module 101R.

In the present embodiment, the driver selects one of three distance settings (setting 1, setting 2 or setting 3) corresponding to successively greater following distances. The actual value to which d_driver is set by the ACC system 110A depends on whether setting 1, setting 2 or setting 3 is selected by the driver and the speed of the vehicle 100. The greater the speed of the vehicle, the greater the value of d_driver set by the system 110A for a given distance setting (i.e. setting 1, 2 or 3). Other arrangements are also useful, such as other numbers of settings. In some embodiments only one setting is available, whilst in others a plurality of settings are available.

In some embodiments, in addition or instead the ACC system 110A is operable to allow the driver to command the system 110A to maintain a distance behind the followed vehicle 100' corresponding to a current distance of the following (or host) vehicle 100 behind the followed vehicle 100', i.e. d_driver is set to the current distance behind the followed vehicle 100'. The value of d_driver set in this manner may be changed by the system 110A as a function of speed of the vehicle 100 in some embodiments. Thus if host vehicle speed subsequently increases, the value of d_driver may be increased whilst if host vehicle speed decreases the value of d_driver may be decreased.

The ACC system 110A is also operable in an ACC economy (or ACC ECO) mode of operation. In this mode the driver is again able to set the value of d_driver. However, the ACC system 110A is arranged to determine a value of a gap, d_ECO, which may be referred to as an 'ECO cruise gap', being a distance that is to be added to the driver desired distance d_driver to obtain a target distance d_target (i.e. d_target=d_driver+d_ECO). The target distance d_target is the distance that the host vehicle 100 is subsequently controlled to maintain behind the followed vehicle 100' by the ACC system 110A. When the ACC system 110A determines that slowing of the vehicle is required, the system 110A is configured to apply only regenerative braking if the actual distance between the host and followed vehicles is greater than d_driver unless circumstances require more aggressive deceleration. Aggressive deceleration may be required for example if the followed vehicle 100' performs an emergency braking manoeuvre. It is found that establishment of the ECO cruise gap allows more efficient operation of the vehicle 100 because regenerative braking may be more frequently employed to achieve required braking when following a vehicle in preference to friction braking, increasing an overall amount of energy recovered when it is required to slow the vehicle over a typical drive cycle.

In order to reduce a frequency with which the engine 121 is commanded to switch on during operation in the ACC ECO mode, when operating in ACC ECO mode the ACC system 110A is arranged to limit the amount of acceleration that it may demand to a value that is achievable by the powertrain of the vehicle 100 with the engine 121 switched off. This has the advantage that if the vehicle is operating with the engine switched off 121, whether in HEV mode or in driver selected EV mode, the controller 140 does not demand an amount of torque from the powertrain that will require the engine 121 to be switched on. The engine 121 therefore remains switched off unless an engine start is required for a different reason. For example, an engine start may be forced in the event that the battery state of charge SOC is too low, or in the event the driver intervenes and demands an amount of torque that cannot be delivered with the engine 121 switched off. In the latter case the engine 121 may be started automatically in order to meet the driver demand for torque. The driver may demand an increased amount of torque for example by executing a tip-in manoeuvre in which the driver depresses the accelerator pedal 181 by a further amount. The driver may do this for example in an attempt to accelerate past the followed vehicle 100'.

It is to be understood that the ACC system 110A may command a prescribed rate of acceleration of the vehicle 100, the controller 140 being operable to determine the amount of torque required of the vehicle powertrain in order to meet the required acceleration. Alternatively the ACC system 110A may command a prescribed amount of torque to be developed by the powertrain, the controller 140 being operable to determine the amount of torque to be provided by the powertrain to meet the required torque demand.

The ACC system 110A is configured continually to monitor a speed of the followed vehicle 100'. If the vehicle 100 is following a followed vehicle 100' with the engine 121 switched off and the ACC system 110A detects that a difference in speed (or speed delta) between a speed of the host vehicle 100 and parameter target_speed exceeds a prescribed threshold value delta_speed, and the followed vehicle 100' is accelerating at a rate exceeding a threshold value acceleration_followed, the ACC system 110A is permitted to command an acceleration rate that exceeds that which may be achieved with the engine 121 switched off in order more quickly to accelerate the host vehicle 100 towards the target speed target_speed. In such a scenario the ACC system 110A may remain in the ECO mode, but the controller 140 commands the engine 121 to start and deliver a required amount of torque in addition to or instead of the CIMG 123, typically in dependence on the amount of drive torque that is required to be developed by the powertrain. Once the difference between the speed of the host vehicle and the value of parameter target_speed falls below delta_speed, the ACC system 110A resumes normal operation in ECO mode. Thus a rate of acceleration that may be imposed on the vehicle 100 by the ACC system 110A is again limited to that which may be provided with the engine 121 switched off. The controller 140 may then command switching off of the engine 121 subject to one or more other conditions being met. For example the controller 140 may require that the engine 121 remains switched on for a certain minimum time period following engine start in order to reduce a risk of mode chattering.

In some embodiments, delta_speed is around 20 km/h. Other values ere also useful, for example any value in the range from around 10 km/h to 40 km/h. Higher or lower values are also useful. It is to be understood that some embodiments of the invention have the advantage that if a speed of traffic on a route such as a motorway or dual carriageway suddenly increases rapidly, for example after passing a busy junction, the ACC system 110A can respond by temporarily requesting a higher rate of acceleration than that which is available in EV mode, allowing cruise speed to be achieved by the vehicle 100 more quickly. This may increase driver enjoyment of the vehicle 100.

It is to be understood that a speed difference between the host vehicle 100 and followed vehicle 100' below which the ACC system 110A resumes normal operation in ECO mode may be set to a value lower than delta_speed by a hysteresis difference value hyst_value. Thus the ACC system 110A may be arranged to resume normal operation in ECO mode if the difference in speed falls below (delta_speed−hyst_value). This feature has the advantage that a risk that the ACC system 110A experiences mode chattering (i.e. switching between ECO mode with the engine switched off and ECO mode with the engine switched on repeatedly in rapid succession) may be reduced.

It is to be understood that if the ACC system 110A determines that the difference in speed exceeds delta_speed more than a prescribed number of times within a given period of time (such as more than three times within a period of 300 s), the ACC system 110A is configured to exit the ECO mode of operation and to assume the 'normal', non-ECO mode. A corresponding alert may be provided to a driver of the vehicle 100 to inform the driver of this change.

In some embodiments the ACC system 110A is also configured to exit the ECO mode if the ACC system 110A determines that one or more prescribed conditions exist in respect of traffic flow. In some embodiments the ACC system 110A may be arranged to monitor data in respect of traffic received from an external source such as a radio data link service such as a traffic message channel (TMC) or the like. For example if received data indicates that traffic density exceeds a prescribed density (such as a certain number of cars per minute passing a certain point along a given route) the ACC system 110A may automatically exit the ECO mode and assume the 'normal' mode.

In some embodiments, alternatively or in addition the ACC system 110A may monitor traffic density by monitoring the number of vehicles that overtake the host vehicle 100 in a given period of time. If this number exceeds a prescribed number in a given time period (such as more than 10 cars per minute) the host vehicle may exit the ECO mode and assume the normal mode.

In some embodiments the ACC system 110A may monitor in addition or instead the number of vehicles that are overtaken by the host vehicle 100 in a given period of time. Again if this number exceeds a prescribed number such as 10 vehicles per minute or any other predetermined value the ACC system 110A may exit the ECO mode and assume the normal mode.

Measurements in respect of the number of vehicles passing or being passed may be made by means of radar module 101R or by one or more other sensors such as one or more other radar modules in addition to or instead of the radar module 101R.

In the embodiment of FIG. 1 a minimum achievable rate of acceleration for the ACC system 110A to remain in ECO mode is also defined, given by parameter accel_min. If the host vehicle 100 is unable to achieve a rate of acceleration of at least accel_min, for example due to the gradient of a driving surface or load carried by or towed by the vehicle 100, the ACC system 110A is configured to start the engine 121. The ACC system 110A is then permitted to request an acceleration rate exceeding that which the CIMG 123 alone may provide. However in these circumstances the ACC system 110A is arranged to remain in ECO mode.

It is to be understood that if the acceleration rate achievable, by means of the CIMG 123 alone subsequently exceeds the minimum value accel_min, the ACC system 110A is arranged to switch off the engine 121 provided no other conditions are met requiring the engine 121 to remain switched on. The ACC system 110A then limits the rate of acceleration that it may command to that which is achievable by means of the CIMG 123 alone. In some embodiments a hysteresis gap may be introduced between the value of accel_min and the value of available acceleration by means of the CIMG 123 alone, at which the ACC system 110A is permitted to shut down the engine 121. This has the advantage of reducing a risk of mode chattering.

It is to be understood that one or more conditions may exist preventing shut down of the engine 121, such as a low battery state of charge SOC, high driver torque demand, a minimum period for which the engine 121 must remain switched on following an engine start, a state of an engine aftertreatment system and/or one or more other conditions, in which case the engine 121 may be controlled to remain switched on.

It is to be understood that in the embodiment of FIG. 1 the ACC system 110A is operable to allow a driver to over-ride the ACC system 110A and demand higher torque values by depressing an accelerator pedal 181. The engine controller 121C is arranged to respond to such a torque demand if it exceeds that commanded by the ACC system 110A. If the driver over-rides the ACC system 110A by demanding increased torque by means of the accelerator pedal 181 more than a prescribed number of times within a given period of time, such as more than three times in a given 10 minute period or any other suitable number of times or period, the ACC system 110A is arranged to exit the ECO mode and assume operation in the 'normal' mode. Thus the ACC system 110A is no longer restricted in the amount of acceleration it may demand, increasing a likelihood that the ACC system 110A will demand values of acceleration (or of torque in order to achieve values of acceleration, as described above), that are more in line with a driver's requirements during a given journey. This feature has the advantage that driver enjoyment of a vehicle 100 may be increased.

In some embodiments the ACC system 110A or controller 140 may be required to command an engine start whilst the ACC system 110A is in ECO mode in the absence of heavy traffic, for example due to the vehicle 100 encountering an inclined driving surface. If such an engine start is commanded, the ACC system 110A logs data in respect of the location at which the engine start was commanded. The ACC system 110A may be configured such that if the vehicle 100 subsequently approaches the same location in the same direction of travel, the engine 121 is switched on in advance of arrival at the logged location so that the engine 121 is ready to deliver drive torque at that location. This feature has the advantage that in some embodiments a more smooth delivery of torque to the wheels may be provided, since the ACC system 110A is able to anticipate locations at which relatively high torque demand is likely to be experienced.

Furthermore, because the ACC system 110A knows in advance of arrival at the location that the engine 121 is likely to be required to deliver drive torque at that location, in some embodiments the engine 121 may be switched on a sufficiently long period in advance of arrival at the location that the engine 121 may be warmed in advance of arrival, enabling a reduction in emissions when drive torque is subsequently delivered by the engine 121 to the driveline 130.

It is to be understood that some embodiments of the present invention have the advantage that if an engine start is required for example because an amount of available acceleration with the engine 121 switched off is below accel_min, the ACC system 110A logs the location and ensures the engine 121 is ready to deliver drive torque when the vehicle 100 subsequently passes that location. As noted above, the reason for the available acceleration to fall to accel_min may for example be due to vehicle loading, and/or inclination of the driving surface at a sufficiently steep angle to reduce available acceleration below accel_min.

In some embodiments, the system 110A may be configured to log the location at which an engine start takes place only if the engine 121 was started (1) not in response to driver intervention causing an engine start such as accelerator pedal actuation, (2) when the traffic density was below a threshold value and (3) when any followed vehicle was not accelerating at a rate exceeding a prescribed rate thereby triggering an engine start.

Other arrangements are also useful.

Throughout the description and claims of this specification, the words "comprise" and "contain" and variations of those words, for example "comprising" and "comprises", mean "including but not limited to", and are not intended to (and do not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A speed control system for a hybrid electric vehicle, the vehicle having a powertrain comprising at least one engine and at least one electric machine, wherein the system is configured to:
allow a driver to set a target vehicle speed;
operate the powertrain in first and second speed control modes so as to change a vehicle speed of the hybrid electric vehicle to maintain a prescribed distance behind a followed vehicle without exceeding the target vehicle speed, wherein in the first speed control mode the system limits operation of the powertrain to an electric vehicle (EV) mode in which the electric machine produces drive torque while the engine produces no drive torque, wherein in the second speed control mode the system allows operation of the powertrain in hybrid electric vehicle (HEV) mode and EV inhibit mode, in which the engine produces drive torque;
determine a required rate of acceleration of the vehicle or required amount of drive torque of the powertrain in order to maintain the prescribed distance behind the followed vehicle;
in the first speed control mode, limit operation of the powertrain to the EV mode by limiting a maximum rate of acceleration of the vehicle or maximum amount of drive torque of the powertrain that is commanded from the system to a rate or amount that is achievable by the electric machine while the engine produces no drive torque and that is less than the required rate or amount;
switch from the first speed control mode to the second speed control mode to cause the engine to produce drive torque, when at least one of a prescribed one or more conditions is met, the at least one condition being other than a condition of the achievable rate or amount being less than the required rate or amount; and
in the second speed control mode, command at least the engine to cause a rate of acceleration of the vehicle or amount of drive torque of the powertrain that is at least equal to the required rate or amount.

2. The speed control system of claim 1, wherein the prescribed one or more conditions includes a condition that a difference between the target vehicle speed and a current vehicle speed exceeds a prescribed delta speed value.

3. The speed control system of claim 2, wherein the prescribed delta speed value is determined in dependence on gradient of a surface over which the vehicle is driving.

4. The speed control system of claim 2, wherein the prescribed one or more conditions includes the condition that a difference between the target vehicle speed and a current vehicle speed exceeds the prescribed delta speed value and a followed vehicle is accelerating at a rate exceeding a prescribed followed vehicle acceleration rate.

5. The speed control system of claim 4, wherein the prescribed followed vehicle acceleration rate is determined in dependence on gradient of a surface over which the vehicle is driving.

6. The speed control system of claim 1, wherein the prescribed one or more conditions includes a condition that the driver demands a rate of acceleration of the vehicle which exceeds a prescribed threshold value, or an amount of drive torque which exceeds a prescribed threshold value.

7. The speed control system of claim 1, further operable automatically to assume the second speed control mode if, while in the first speed control mode, the at least one engine is started more than a prescribed number of times within a prescribed period of time.

8. The speed control system of claim 1, further operable automatically to assume the second speed control mode if, while in the first speed control mode, it is determined that a density of traffic exceeds a prescribed value.

9. The speed control system of claim 8, further operable to determine the density of traffic responsive to traffic density data received by the system from a traffic information service, or responsive to measurement of a number of vehicles passing the vehicle within a prescribed period of time, or responsive to measurement of a number of vehicles passed by the vehicle within a prescribed period of time.

10. The speed control system of claim 1, further operable automatically to assume the second speed control mode if, while in the first speed control mode, the driver increases a rate of acceleration of the vehicle above a maximum value available in the EV mode: one or more times in a given time period, a prescribed number of times over a given distance, or a prescribed number of times over a given journey.

11. The speed control system of claim 1, wherein the prescribed one or more conditions includes a condition that a maximum rate of acceleration achievable by the vehicle in the EV mode is below a prescribed threshold value.

12. The speed control system of claim 1, wherein the prescribed one or more conditions includes a condition that a maximum amount of torque achievable by the vehicle in the EV mode is below a prescribed threshold value.

13. The speed control system of claim 1, further comprising a driver-operable control to select one of the first and second speed control modes.

14. The speed control system of claim 1, further operable to store data in respect of geographical locations at which an engine start has been commanded by the system, when the vehicle subsequently approaches a same location in substantially a same direction of travel the system being configured to start the at least one engine in advance of arrival at the location such that power generated as a consequence of starting the at least one engine is delivered to a driveline of the vehicle substantially at said location.

15. The speed control system of claim 14, further configured to start the at least one engine in advance of arrival at the same location such that drive torque from the engine is delivered to the driveline of the vehicle substantially at said same location.

16. The speed control system of claim 14, further configured to store said data in respect of geographical location only when the at least one engine was started in the absence of driver intervention causing an engine start.

17. The speed control system of claim 14, further configured to store said data in respect of geographical location only when the at least one engine was started when traffic density was below a threshold value.

18. The speed control system of claim 14, further configured to store said data in respect of geographical location only when a followed vehicle was not accelerating at a rate exceeding a prescribed rate thereby triggering an engine start.

19. The speed control system of claim 14, wherein the at least one engine was started when traffic density was below a threshold value.

20. A method of controlling speed of a hybrid electric vehicle via a speed control system, wherein the vehicle has a powertrain comprising an engine and an electric machine, the method comprising:
  allowing a driver to set a target vehicle speed;
  operating the powertrain in first and second speed control modes to change a vehicle speed of the hybrid electric vehicle to maintain a prescribed distance behind a followed vehicle without exceeding the target vehicle speed;
  wherein in the first speed control mode the system limits operation of the powertrain to an electric vehicle (EV) mode in which the electric machine produces drive torque while the engine produces no drive torque, wherein in the second speed control mode the system allows operation of the powertrain in hybrid electric vehicle (HEV) mode and EV inhibit mode, in which the engine produces drive torque;
  determining a required rate of acceleration of the vehicle or required amount of drive torque of the powertrain in order to maintain the prescribed distance behind the followed vehicle;
  in the first speed control mode, limiting operation of the powertrain to the EV mode by limiting a maximum rate of acceleration of the vehicle or maximum amount of drive torque of the powertrain that is commanded from the system to a rate or amount that is achievable by the electric machine while the engine produces no drive torque and that is less than the required rate or amount;
  switching from the first speed control mode to the second speed control mode to cause the engine to produce drive torque, when at least one of a prescribed one or more conditions is met, the at least one condition being other than a condition of the achievable rate or amount being less than the required rate or amount; and
  in the second speed control mode, commanding at least the engine to cause a rate of acceleration of the vehicle or amount of drive torque of the powertrain that is at least equal to the required rate or amount.

* * * * *